United States Patent
Mack et al.

(10) Patent No.: US 12,316,094 B2
(45) Date of Patent: May 27, 2025

(54) PROTECTIVE DEVICE FOR AN ELECTRONIC COMPONENT CONNECTED TO AN INTERFACE

(71) Applicant: Robert Bosch GmbH, Stuttgart (DE)

(72) Inventors: Juergen Mack, Goeppingen (DE); Mickael Segret, Stuttgart (DE); Christoph Klee, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 379 days.

(21) Appl. No.: 17/905,846

(22) PCT Filed: Jan. 26, 2021

(86) PCT No.: PCT/EP2021/051705
§ 371 (c)(1),
(2) Date: Sep. 8, 2022

(87) PCT Pub. No.: WO2021/185503
PCT Pub. Date: Sep. 23, 2021

(65) Prior Publication Data
US 2023/0122579 A1   Apr. 20, 2023

(30) Foreign Application Priority Data
Mar. 20, 2020   (DE) .................. 10 2020 203 591.1

(51) Int. Cl.
*H02H 3/00* (2006.01)
*H02H 1/00* (2006.01)
(Continued)

(52) U.S. Cl.
CPC ............ *H02H 3/20* (2013.01); *H02H 1/0007* (2013.01); *H02H 9/02* (2013.01)

(58) Field of Classification Search
None
See application file for complete search history.

(56) References Cited

U.S. PATENT DOCUMENTS 8,072,348 B2 * 12/2011 Rogai .................. G01D 4/004
340/870.11
8,421,588 B1 * 4/2013 Ross .................... G08C 17/02
340/5.1
(Continued)

FOREIGN PATENT DOCUMENTS

CN      110797846 A     2/2020
DE      102 32 941 A1   2/2004
(Continued)

OTHER PUBLICATIONS

International Search Report corresponding to PCT Application No. PCT/EP2021/051705, mailed Apr. 7, 2021 (German and English language document) (5 pages).

*Primary Examiner* — Stephen W Jackson
(74) *Attorney, Agent, or Firm* — Maginot, Moore & Beck LLP

(57) ABSTRACT

The disclosure relates to a protective device for an electronic component connected to an electrical interface, comprising: a detection device for detecting electrical voltage and/or electrical current at the electronic component; a monitoring device; an electronic switch connected in series with the electronic component for disconnecting the electronic component from the electrical interface in the event that an impermissibly high electrical voltage is applied at the electronic component, wherein at least double the nominal voltage is identified as an impermissibly high electrical voltage, wherein in the event that an impermissibly high electrical voltage is no longer detected at the electronic component, the electronic component can be connected to the interface by means of the electronic switch.

14 Claims, 9 Drawing Sheets

(51) Int. Cl.
*H02H 3/20* (2006.01)
*H02H 9/02* (2006.01)

(56) References Cited

U.S. PATENT DOCUMENTS

2006/0114632 A1* 6/2006 Maier .................... H02H 3/025
 361/93.1
2021/0066013 A1* 3/2021 Kumar ................... H01H 9/548

FOREIGN PATENT DOCUMENTS

| DE | 10 2006 006 878 A1 | 7/2007 |
| DE | 10 2011 121 975 A1 | 7/2012 |
| DE | 10 2011 077 460 A1 | 12/2012 |
| JP | 2015-31639 A | 2/2015 |

* cited by examiner

PROTECTIVE DEVICE FOR AN ELECTRONIC COMPONENT CONNECTED TO AN INTERFACE

This application is a 35 U.S.C. § 371 National Stage Application of PCT/EP2021/051705, filed on Jan. 26, 2021, which claims the benefit of priority to Serial No. DE 10 2020 203 591.1, filed on Mar. 20, 2020 in Germany, the disclosures of which are incorporated herein by reference in their entirety.

The present disclosure relates to a protective device for an electronic component that is connected to an interface. The disclosure furthermore relates to a method for operating a protective device for an electronic component that is connected to an interface.

BACKGROUND

In order to have electrical power available while mobile without connection to an energy grid, there are electrochemical energy carriers, for example rechargeable battery cells. One type often used currently is the lithium-ion cell, which combines good energy and power density. Common designs are round cells, prism cells or pouch cells.

In order to be able to safely operate a lithium-ion cell, it is necessary to monitor the temperature thereof and to configure the operating parameters so as to be dependent on the temperature. Various temperature sensors are used to detect the temperature. In this case, it is important that the sensor is in as close thermal contact with the lithium-ion cell as possible.

Rechargeable battery packs in which a temperature sensor is mounted on a flexible printed circuit board and is pressed against a cell by way of said printed circuit board using an elastic element are known. This supports the temperature sensor being thermally connected to a cell as closely as possible.

A sensor that changes its ohmic resistance depending on the temperature is often used as temperature sensor. If this resistance becomes lower at a higher temperature, this is referred to as an NTC (negative temperature coefficient). In many cases, said temperature sensor is located in the battery pack, but is measured and evaluated by the charger or discharging electrical apparatus in the case of an apparatus system with a replaceable battery pack. This measurement is typically carried out by applying a voltage to the temperature sensor via a series resistor and the measurement and evaluation of the voltage drop across the series resistor and temperature sensor.

FIG. 10 shows an electrical energy store 300 in the form of a rechargeable battery pack comprising some cells 301a . . . 301d that are connected to a management apparatus 400 (for example charger) via an interface 200.

International standards in the meantime require that the individual cell voltages of a battery pack made up of a plurality of cells are monitored individually during charging. In order to be able to communicate a disconnection signal in the event of a fault, it is conventional to manipulate the temperature sensor. This can be done, for example, using an electronic switch 50 in series with the NTC temperature sensor 30 (see FIG. 11) or an electronic switch 50 in parallel with the NTC temperature sensor 30, which is indicated in principle in FIG. 12.

A monitoring apparatus 40 in the form of an electronics system for individual cell monitoring should be installed in the battery pack for this purpose. In order that the battery pack is not discharged by the monitoring apparatus 40 in the quiescent state, it is conventional for the monitoring apparatus 40 to be switched on only when the battery pack is in operation, for example when a voltage is applied to the NTC temperature sensor 30.

In order to limit electric current in the event of a fault, fuses can also be used, for example. These convert a portion of the electric current flowing into thermal energy through resistance and voltage drop, the thermal energy causing a conductive material to melt and thus interrupting the flow of electric current. The lower the tripping rated current for this, the higher the resistance must be in principle. Another option for limiting electric current is the use of a transistor in conjunction with a resistor as current source. In this case, a flowing current counteracts the control voltage of the transistor through a voltage drop at the resistor so that an equilibrium and thus a defined electric current result.

As illustrated in FIG. 11, a monitoring apparatus 40 with integrated circuits that is used to monitor the operating state within the electrical energy store 300 is known. Said monitoring apparatus has, for example, inputs for monitoring individual cell voltages, temperature or else current. If the specification limit for a parameter is violated, such circuits trip an alarm. This is typically a level change at a terminal, wherein a pin goes from logic low to logic high or vice versa.

If an NTC temperature sensor is used, the following problem may arise in the case of improper use or severe contamination:

The measuring contact 203, to which the electronic component 30 in the form of the NTC temperature sensor is connected, conversely to its specified function, is connected to the positive pole 201 of the electrical energy store 300 (for example by metal components). As a result, the monitoring apparatus 40 is switched on and detects a normal operating state (electrical voltage at the temperature sensor 30). As the voltage is applied directly to the temperature sensor 30, rather than via a series resistor, current limitation is only executed by the resistor of the NTC temperature sensor 30. The NTC temperature sensor 30 heats up as a result of the power thus converted, thereby resulting in a lower NTC resistance and, in turn, an increase in the power converted (positive feedback or cycle).

As the NTC temperature sensor is in close thermal contact with the cells 301a . . . 301d, a hotspot occurs at the corresponding cells 301a . . . 301d, which can result in a thermal imbalance, and can disadvantageously cause more rapid aging of the electrical energy store 300.

Conventional methods for the limitation of electric current, on the grounds of the necessity of a resistance for this purpose, are invariably associated with a distortion of the temperature signal. The electric current flowing in the event of a fault can be relatively low, for example 50 mA, but can nevertheless result in high temperatures. A fuse with a current rating of 50 mA typically has a resistance of 10 ohms. Installation thereof would result in the distortion of the temperature signal.

SUMMARY

It is an object of the present disclosure to provide an improved protective device for an interface.

According to a first aspect, the object is achieved by way of a protective device for an electronic component that is connected to an electrical interface, comprising:
 a detection apparatus for detecting electrical voltage and/or electric current at the electronic component;
 a monitoring apparatus;

an electronic switch, connected in series with the electronic component, for disconnecting the electronic component from the electrical interface in the event that an impermissibly high electrical voltage is applied to the electronic component, wherein at least double the nominal voltage is identified as an impermissibly high electrical voltage, wherein, in the event that an impermissibly high electrical voltage is no longer detected at the electronic component, the electronic component can be connected to the interface by means of the electronic switch.

A high-impedance disconnection of the electronic component that is to be protected and a reconnection when the fault ceases to exist is advantageously achieved in this way. In this case, a fault is considered to be an electrical overvoltage at the electronic component that is to be protected, which may arise, for example, due to an electrical short circuit on account of metal dust. Use of a fuse is advantageously not necessary. As a result, use of the electronic component is thereby safer and more efficient, as a result of which an improved protective function can be assumed by the component that is protected by the protective device.

According to a second aspect, the object is achieved by way of a method for operating a protective device for an electrical interface, comprising the steps of:
detecting electrical voltage and/or electric current at the electronic component; and
disconnecting the electronic component from the electrical interface in the event that an impermissibly high electrical voltage is applied to the electronic component, wherein at least double the nominal voltage is identified as an impermissibly high electrical voltage, wherein, in the event that an impermissibly high electrical voltage is no longer detected at the electronic component, the electronic component is connected to the interface by means of the electronic switch.

Preferred embodiments of the proposed protective device are the subject matter of the disclosure.

One preferred embodiment of the proposed protective device makes provision for a resistance value of the disconnection of the electronic component to be at least approximately 1 kΩ to approximately 10 kΩ, preferably approximately 10 kΩ to approximately 500 kΩ, more preferably approximately 1 MΩ to approximately 10 MΩ. A high-impedance disconnection of the component that is to be protected from the interface is realized in this way without using a latch.

Another preferred embodiment of the proposed protective device makes provision for the detection apparatus to be designed as a voltage detection apparatus, wherein the voltage detection apparatus is connected in parallel with the electronic component and the switching apparatus. This advantageously provides an alternative to determining the event of a fault at the electronic component that is to be protected.

Another preferred embodiment of the proposed protective device makes provision for the monitoring apparatus to be designed as a Schmitt trigger. The Schmitt trigger can distinguish normal operation from an overvoltage in this way, as a result of which an efficient identification of permissible operation of the electronic component is supported.

Another preferred embodiment of the proposed protective device makes provision for an end stage for implementing electrical levels to be provided at the output of the Schmitt trigger. In this way, an efficient further processing of the detected electrical level is supported.

Another preferred embodiment of the proposed protective device makes provision for the electronic component to be an NTC or a coding resistor. As a result, different electronic components are advantageously able to be protected by the proposed protection apparatus.

Another preferred embodiment of the proposed protective device makes provision for the monitoring apparatus to be designed as a microcomputer, wherein in particular the detected electrical voltage is evaluated using an analog-to-digital converter, wherein the disconnection and connection of the electronic component that is to be protected is implemented via software. In this way, it is advantageously possible to reproduce a behavior of a Schmitt trigger via hardware and software, for example.

Another preferred embodiment of the proposed protective device makes provision for the detected electrical voltage to be evaluated using a small-signal MOSFET. In this way, a MOSFET can be used as comparator threshold switch in order to detect the electrical voltage drop at the electronic component that is to be protected.

Another preferred embodiment of the proposed protective device makes provision for the detected electrical voltage to be fed to a comparator that uses a transistor to actuate the MOSFET that is to be switched. Another variant for detecting the electrical voltage at the electronic component that is to be protected is provided in this way.

Another preferred embodiment of the proposed protective device makes provision for the detection apparatus to be designed as a current detection apparatus that is interconnected in series with the electronic component and the electronic switch, wherein an electrical voltage drop is measured, wherein a latch circuit of discrete design is provided to evaluate the electrical voltage detected. A state of the current detection apparatus after the electronic component that is to be protected is disconnected can advantageously be stored in this way.

Another preferred embodiment of the proposed protective device makes provision for a current-limiting element to be connected in series with the electronic component. A damaging effect of the electrical overvoltage on the electronic component that is to be protected is advantageously at least limited in this way.

Another preferred embodiment of the proposed protective device makes provision for the current-limiting element to be at least one of the following: protective resistor, conductor track, current source, fuse, resistor with a defined tripping behavior. Different variants of current-limiting elements can advantageously be provided in this way.

The disclosure is described in detail below with further features and advantages on the basis of a plurality of figures. Elements that are identical or have identical functions bear the same reference signs in this case. The figures are intended, in particular, to elucidate the principles essential to the disclosure and are not necessarily drawn in a manner true to scale. For the sake of better clarity, it may be provided that not all of the figures depict all of the reference signs.

Disclosed method features emerge analogously from corresponding disclosed apparatus features, and vice versa. This means in particular that features, technical advantages and embodiments relating to the protective device emerge in an analogous manner from corresponding embodiments, features and advantages relating to the method for operating a protective device, and vice versa.

In the figures:

FIG. 1 shows a basic block circuit diagram of a proposed protective device;

FIG. 2 shows a first embodiment of a proposed protective device;

FIG. 3 shows another embodiment of a proposed protective device;

FIG. 4 shows another embodiment of a proposed protective device;

FIG. 5 shows another embodiment of a proposed protective device;

FIG. 6 shows a basic sequence of a method for operating a proposed protective device;

FIG. 7 shows a block circuit diagram of another embodiment of a proposed protective device;

FIG. 8 shows a graph with temperature characteristic curves of an element that is to be protected and the compensation element;

FIG. 9 shows a flowchart of a method for operating the protective device;

FIGS. 10-12 show conventional arrangements for protecting an electrical energy store;

FIGS. 13-15 show embodiments of a protective device for an electronic component that is connected to an interface; and FIG. 16 shows a flowchart with a method for operating a protective device for an electronic component that is connected to an interface.

BRIEF DESCRIPTION OF THE DRAWINGS

A main idea of the present disclosure is to provide a protective device for an electronic component that is to be protected and that is connected to an electrical interface.

Using the proposed protective device, it is advantageously possible to be able to substantially prevent damage to the component or assembly that is connected to the interface.

Figure 1:
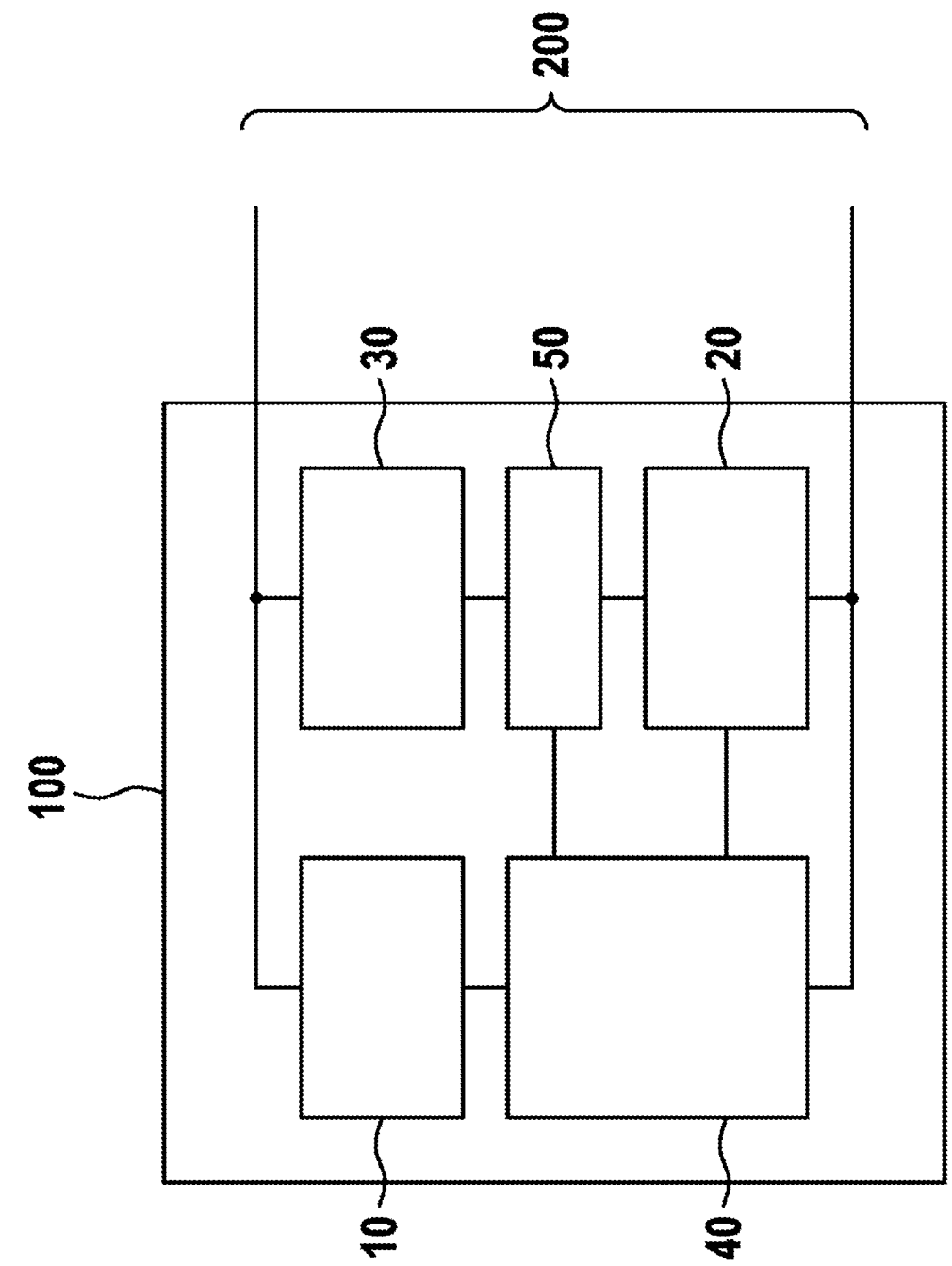

For this purpose, it is proposed to suppress the electric current virtually without distorting a temperature signal in rated operation of an electronic component used as temperature detection element. To this end, provision is made to detect the electric current through the electronic component and, where necessary, to disconnect same using a switching apparatus, which is advantageously generally already present.

As an alternative, the electronic component that is to be protected can also be bypassed so that a high electric current can trip a fuse with a high rated current and low resistance caused thereby.

It is advantageously possible to use the proposed protective device to protect circuit parts that are connected and are able to be connected to an electrical interface, such as portable electric tools, battery packs and the like, for example. The proposed protective device has at least one sensor (current or voltage sensor) that can disconnect the connected electronic component or the connected circuit in a high-impedance manner.

In this context, "high-impedance" is understood to mean a state in which there is no damage to the electronic component or the electronic assembly or no or only very little energy conversion. Furthermore, "high-impedance" can also be understood to mean an increase in the total resistance by at least a factor of 3, particularly advantageously at least a factor of 20, in relation to a nominal resistance. In particular, a flow of electric current through the electronic component or the electronic assembly is sufficiently limited for this purpose. If the "high-impedance" disconnection is no longer necessary, the electronic component or circuit part can be reconnected (self-resetting) or the impedance can be reduced.

A piece of information about whether disconnection should take place is supplied by the sensors. A monitoring apparatus compares this information with at least one specifically defined value and, in general, initiates "high-impedance" disconnection in the event of an overshoot, wherein an overshoot may be present, for example, in the event that the information supplied by the sensor departs from or exceeds an appropriate and customary operating range.

An essential advantage of the proposed protective device consist in particular in that the electronic component that is to be protected or of the electronic assembly that is to be protected (for example a rechargeable battery pack) is disconnected before any damaging rise in temperature occurs.

A first category of embodiment variants of the proposed protective device provides for a measurement of the electrical voltage at the interface. It is thus possible to react to the presence of an electrical voltage that lies outside a defined operating voltage range within a very short response time. If the electrical voltage lies outside the defined operating voltage range, the electronic component (for example the NTC or coding resistor) or the electronic circuit assembly undergoes high-resistance disconnection from the interface and/or from a common reference potential (for example ground).

Advantageously, as a result, no latch circuit is required, as the electrical voltage after the disconnection does not substantially decrease as a result of an increase in impedance. After a disconnection process of the electronic component or the electronic assembly, the electrical voltage usually remains constant, or even increases. Consequently, for the proposed protective device, generally only a low amount of hysteresis, or even no hysteresis, is required.

Embodiments of the proposed protective device are explained in more detail below with reference to the abovementioned first category of embodiment variants.

DETAILED DESCRIPTION

FIG. 1 shows a block circuit diagram of a proposed protective device 100 for an electrical interface 200 to which an electronic component 30 that is to be protected (for example an NTC or coding resistor) is connected. A monitoring apparatus 40 can be seen, which cooperates functionally with a voltage detection apparatus 10, a current detection apparatus 20 and an electronic switch 50. As a result, in the event of a fault it is possible to use the proposed protective device 100 for the interface 200 to disconnect the electronic component 30 that is to be protected or the assembly that is to be protected from the interface 200 in a high-impedance manner and to reconnect it to the interface 200 when the fault ceases to exist. In the event of a fault, it is conceivable that an electrical voltage is fed in at a terminal of the electronic component 30 that is to be protected, in the form of an NTC, for example by means of a short circuit, which is permitted by the presence of metal dust. Thus, in general, the electrical voltage and the impedance are not entirely known.

Due to the resulting flow of electric current through the electronic component 30 in the form of an NTC, the NTC resistance decreases rapidly, wherein, for example, the electric current can rise from an original value of between approximately 10 mA and approximately 21 mA to approximately 100 mA. This results in the self-heating of the NTC and thus an associated reduction in the NTC resistance value. In a very hot NTC (for example 100 ohms for an NTC whose resistance at room temperature is 6.8 kiloohms), at a terminal voltage of 10 V, a current of up to 100 mA can be reached at the interface 200, which constitutes a loading limit for a switch-off MOSFET. As a result, electrical voltages greater than approximately 10 V at the interface 200 should be prevented, wherein an electrical activation voltage can be significantly higher.

In the first category of embodiment variants, a voltage measurement is proposed at the input of the electronic component 30 that is to be protected. Nominally, an electrical voltage at the interface 200 can be a maximum of 5.0 V. A very high-impedance tap-off of an electrical voltage using a comparator or a MOSFET, is provided, as a result of which very rapid detection of the electrical voltage at the interface 200 is possible.

To detect the electrical voltage drop at the electronic component 30 that is to be protected, a small-signal MOSFET with a voltage divider and/or an RC filter can also be used, said MOSFET detecting an overshoot of more than 7 V at the pin of the electronic component 30 that is to be protected.

Figure 2:
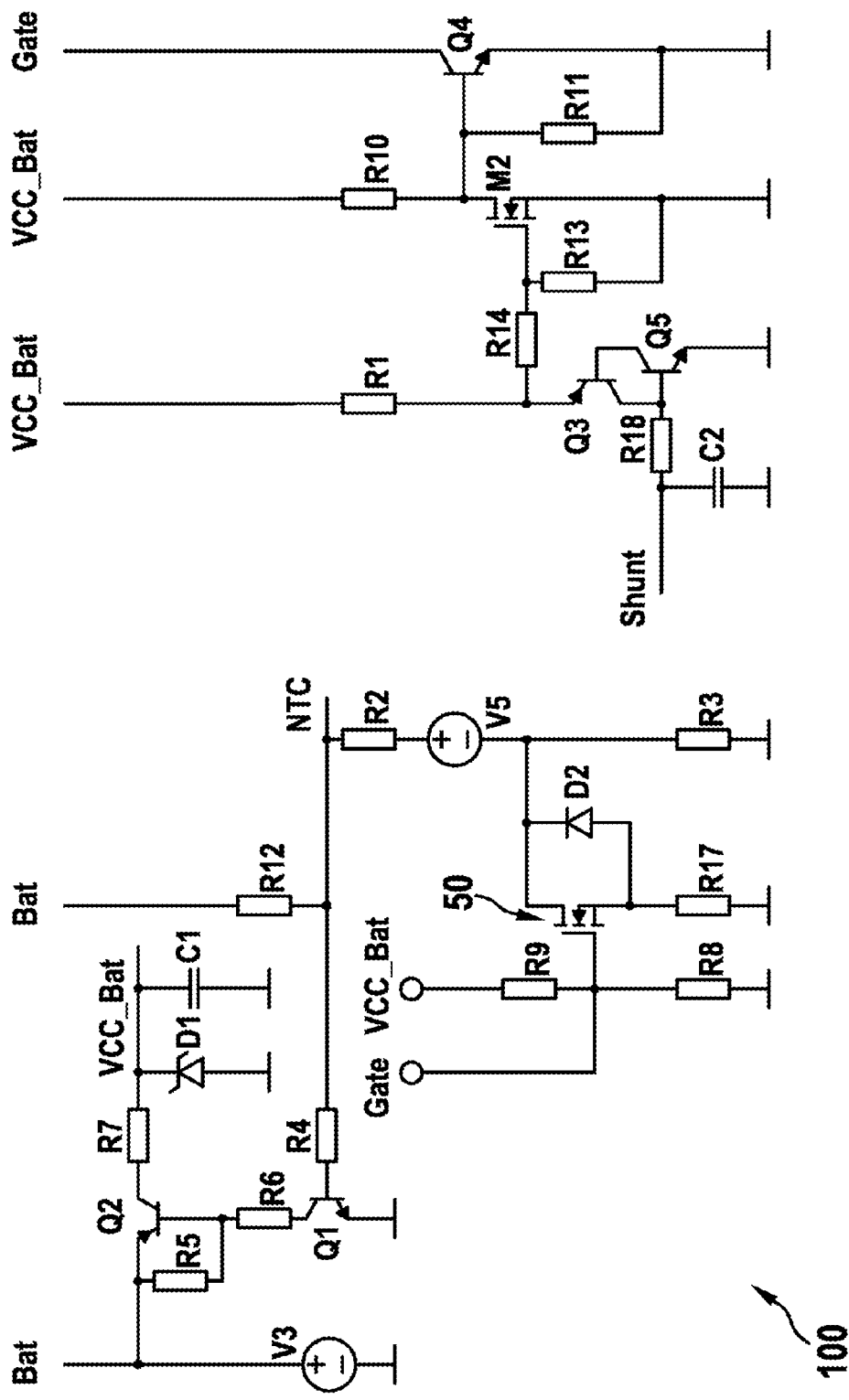

FIG. 2 shows an embodiment of a proposed protective device 100 for an electrical interface 200. In the left-hand upper region, a switch that is provided for simulating the protective device 100 can be seen. A terminal of the component 30 that is to be protected and that is denoted by "NTC" is shown.

An electrical voltage V5 that is generated on account of a current flow or self-heating of the electronic component 30 that is to be protected in the form of an NTC is shown. The component 30 that is to be protected can be disconnected from the interface 200 (not illustrated) in a high-impedance manner by means of a terminal "Gate".

A resistor R12 represents for example metal dust, which causes an electrical short circuit between the component 30 that is to be protected and a voltage source VCC_Bat. The electric current through the electronic component 30 can be detected metrologically by means of a shunt R17 by way of an electrical voltage drop, wherein an electronic switch 50 in the form of a MOSFET can be connected by means of the terminal "Gate" in order to isolate the electronic component 30 from the battery voltage VCC_Bat by opening the electronic switch 50.

The right-hand section of the circuit in FIG. 2 represents a discrete latch circuit, which simulates a thyristor from the two transistors Q3 and Q5, the thyristor "observing" a circuit state of the protective device 100 after the electronic component 30 has been disconnected. In the event that an electric overcurrent through the electronic component 30 is detected, this state continues to be stored by means of the latch circuit, even if the current through the electronic component 30 decreases to zero, the electronic switch 50 remains open and thus prevents any reconnection of the electronic component 30 to the battery voltage Bat. In order to reset the state stored by the latch circuit, the supply voltage VCC_Bat of the battery pack is disconnected.

It is also conceivable, for example, for the evaluation of the electric voltage rise, implemented by means of the discrete shunt R17 in the arrangement according to FIG. 2, to be implemented by means of an A/D converter and a monitoring apparatus 40 in the form of a microcomputer. To this end, an additional ADC input is required at the microcomputer, wherein software is used to detect a fault state. Additional functions, such as auto-recovery, for example, are also conceivable in this case.

Figure 3:
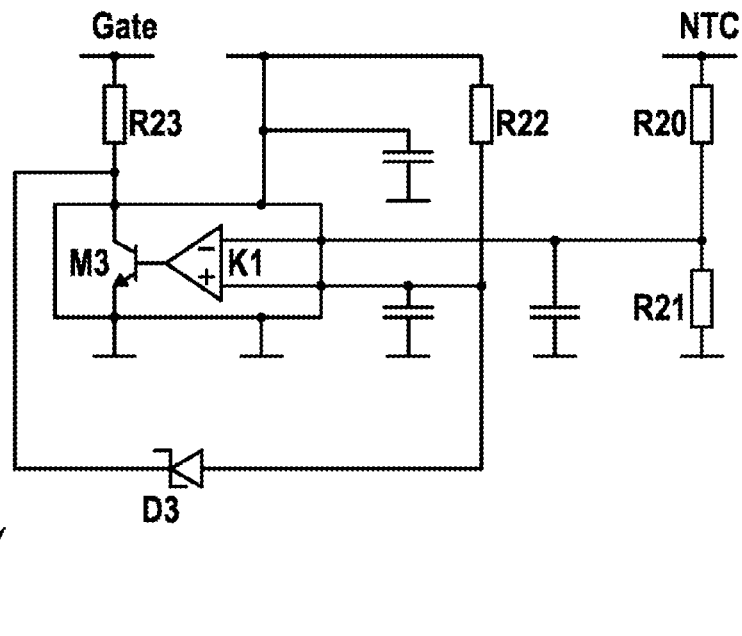

It is also conceivable, for example, for the evaluation of the voltage rise, implemented by means of the discrete shunt R17 in the arrangement according to FIG. 2, to be implemented by means of a discrete latch circuit. In this way, software is advantageously not involved in the detection and disconnection mechanism (not illustrated). The electronic component 30 that is to be protected remains disconnected from the interface 200 until a short-circuit bridge has been removed. This variant of the proposed protective device 100 is also advantageously self-resetting. FIG. 3 shows another embodiment of a proposed protective device 100 for an electrical interface 200. It can be seen that the terminal NTC of the electronic component 30 that is to be protected (not illustrated) is connected to a voltage divider R20, R21, which has a total maximum resistance value of 1 MΩ, for example. As a result, the electrical voltage at the electronic component 30 that is to be protected is divided and fed to a non-inverting input of a comparator K1, at the output of which a transistor M3 for the actuation of the switching terminal Gate of the electronic switch 50 (not illustrated) for the disconnection of the electronic component 30 (not illustrated) is operated. At an operating voltage of 3.3 V, a switch-on threshold is approximately 6.6 V and a switch-off threshold is approximately 0.6 V. A resistor R23, in combination with capacitors of the protective device 100, is appropriately dimensioned, wherein particular care is taken to ensure that the electronic component is disconnected from the interface 200 (not illustrated) in such a way that there is no resulting damage to the electronic component.

As a result, the voltage rise at the electronic component that is to be protected is evaluated in this manner by means of the comparator K1, wherein very narrow trip thresholds advantageously can be set as a result. In the case of appropriate trip thresholds, this variant of the protective device 100 is also self-resetting.

Figure 4:
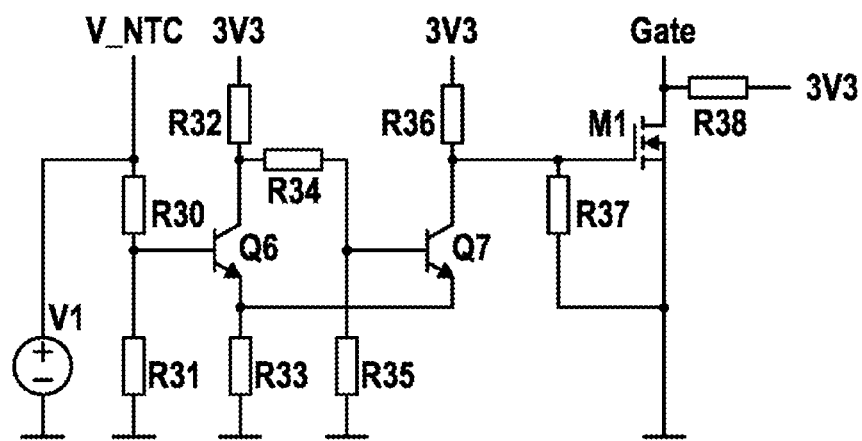

FIG. 4 shows another embodiment of a proposed protective device 100 for an electrical interface. A monitoring apparatus 40 can be seen, which is designed in the form of a Schmitt trigger and comprises the transistors Q6, Q7. An output stage of the Schmitt trigger can also be seen, in the form of resistors R37, R38 and a MOSFET transistor M1 for the formation of an appropriate electrical level. The electronic component that is to be protected is not illustrated in FIG. 4. By means of this variant, an electrical voltage V_NTC can be detected at the electronic component that is to be protected, wherein appropriate dimensioning of the resistors R30-R35 makes it possible to achieve a situation in which a threshold of the Schmitt trigger is appropriately set so that the latter switches a transistor M1 for the actuation of the electronic switch (not illustrated) for the disconnection of the electronic component that is to be protected. As an alternative, this can be achieved by appropriately dimensioning the resistors R30-R37 when the protective device also comprises the voltage divider for switching M1.

As a result, in this variant, the electrical voltage rise at the electronic component 30 that is to be protected is evaluated by means of a discrete Schmitt trigger, which can be used to set close trip thresholds. When appropriate trip thresholds are met, this variant of the protective device 100 is also self-resetting.

Figure 5:
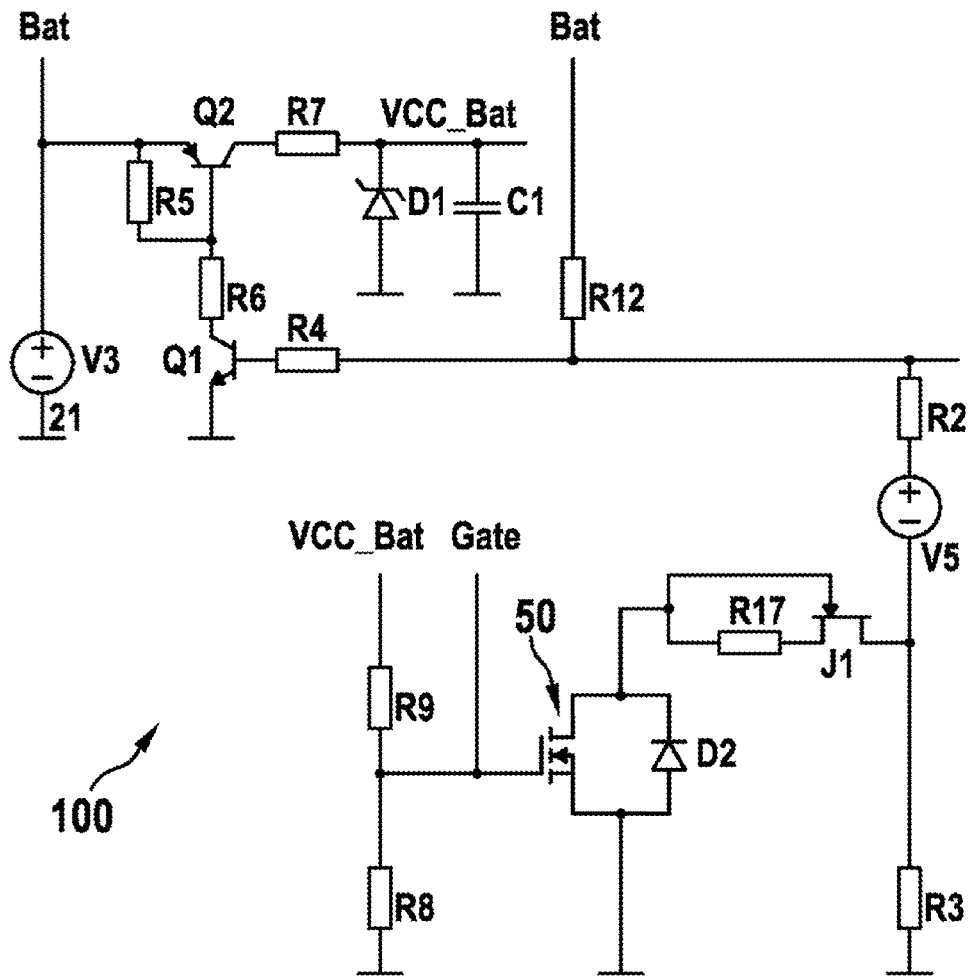

FIG. 5 shows another embodiment of a protective device 100 for an electrical interface that resembles the variant according to FIG. 2 but wherein, in this case, a constant current source R17, J1 or a current-limiting function by means of an N-channel JFET J1 and negative gate-source feedback coupling is provided. This variant advantageously requires only a very limited number of components, as a result of which only a small amount of space on the circuit board is required. This variant of the proposed protective device 100 is also self-resetting or features a regulated/negative feedback mode.

Provision may also advantageously be made for the electrical voltage rise at the interface 200 to be evaluated by means of an A/D converter and a microcontroller. In this case, the monitoring apparatus 40 is preferably designed as a microcomputer, as a result of which, for example, the Schmitt trigger can be implemented in software in order to detect the fault state at the electronic component 30. As a result, additional functions such as auto-recovery, for example, can also advantageously be implemented.

In another variant that is not represented in the figures, provision may also be made for the voltage rise at the electronic component 30 that is connected to the interface 200 to be evaluated using a small-signal MOSFET. In this manner, it is also advantageously possible to set a more generous voltage range for the electrical trip voltage to be used to disconnect the electronic component 30 that is to be protected.

Advantageously, for those variants of the above-mentioned protective devices 100 that measure the electrical voltage at the electronic component 30 that is to be protected, no latch circuit is required, since the electrical voltage at the interface 200 does not drop after the electronic component 30 that is to be protected has been disconnected.

Figure 6:
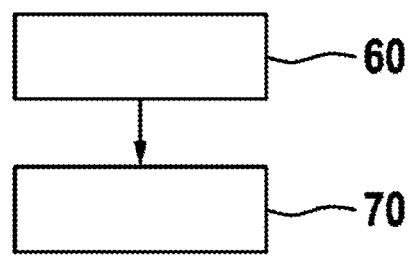

FIG. 6 shows a basic sequence of a method for operating a proposed protective device for an electronic component 30 that is connected to an interface 200.

In a step 60, an electrical voltage and/or an electric current at the electronic component 30 is detected.

In a step 70, the electronic component 30 is disconnected from the electrical interface 200 in the event that an impermissibly high electrical voltage is applied to the electronic component 30, wherein at least double the nominal voltage is identified as an impermissibly high electrical voltage, wherein, in the event that an impermissibly high electrical voltage is no longer detected at the electronic component 30, the electronic component 30 is connected to the interface 200 by means of the electronic switch 50.

Typically, battery packs generally use a temperature measurement circuit to monitor the cell temperature. This is frequently implemented in the form of a NTC on the battery electronics side, together with a contact element via which a tool or a charger having an appropriate series resistor applies a supply voltage to the NTC from outside. The NTC is thermally coupled to one or more cells. The voltage at the NTC contact correlates to the resistance/temperature of the NTC.

Figure 7:
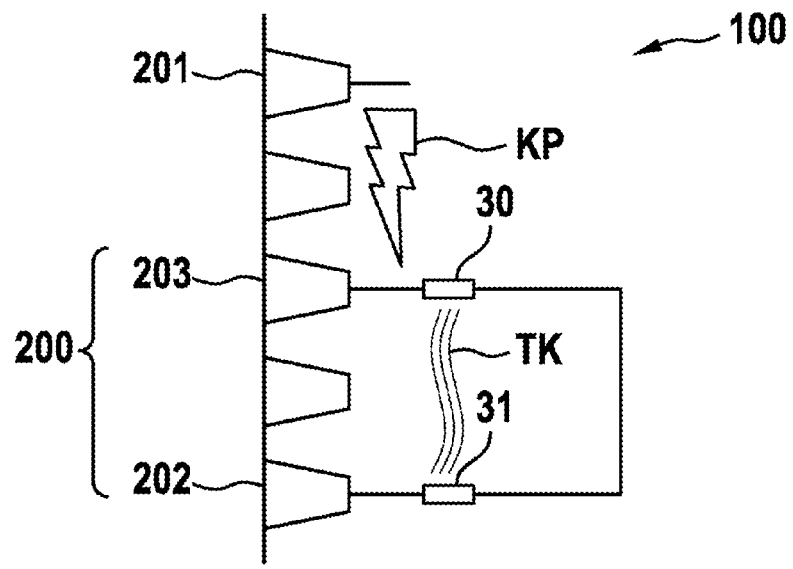

If, as illustrated in FIG. 7, a short circuit KP is present between the positive pole 201 of the battery pack and the NTC contact 203 as a result of contamination, an electric current that is not limited by a defined series resistor flows through the NTC. This results in the NTC heating up, as a result of which its resistance is reduced due to its temperature response. The electric current increases continuously as a result. Since the power loss is quadratically related to current ($P=R\times I^2$), the power loss at the NTC increases as the NTC resistance reduces, as a result of which heating is further accelerated. On account of the thermal coupling to the cell, this can result in a hotspot on the cell, which can lead to a thermal imbalance and can cause the electrical energy store 300 disadvantageously to age more rapidly.

It is proposed that this self-accelerating heating should be counteracted and that, in the fault case mentioned, a safe state of the battery pack should be generated. To this end, it is proposed to arrange a PTC element within the NTC temperature measurement circuit. If the system heats up in response to a short circuit, the PTC also heats up. The self-intensifying characteristic of the NTC (the resistance of which reduces with temperature) is thus counteracted by a self-limiting characteristic of the PTC (the resistance of which increases with temperature). This advantageously results in an intrinsically safe system, which requires no further logic components, for example a microprocessor. The proposed protective device 100 thus comprises a single component, that is to say has minimal design complexity, and due to the simplicity is cost-effective and can be implemented in a low-risk manner.

A proposed protective device 100 thus comprises a compensation element 31 in the form of a component having a positive temperature coefficient (for example a PTC), which is connected in series with the electronic component 30 (for example an NTC) at a pole (for example the negative pole 202) of the battery pack or at a signal contact 203 of the interface 200. In the "inactive" state, that is to say in the absence of a short circuit at the measuring contact 203, the compensation element 31 assumes a low resistance, such that there is no relevant influence upon temperature measurement by means of the NTC. To this end, a resistance value is selected for the PTC that is low in relation to the NTC resistance value in the relevant operating range. In particular, switching thresholds (for example excessively high temperature/excessively low temperature) should not be significantly manipulated as a result.

In the "active" state, that is to say in the presence of a short circuit at the measuring contact 203, a state of equilibrium is established, according to the electrical voltage applied to the measuring contact 203 and the sum of all the series resistors. In the high temperature range, the rise in resistance of the PTC is significantly greater than the drop in resistance at the NTC, as a result of which the total resistance rises until an equilibrium is achieved.

This equilibrium temperature is configured such that there is no risk to other system components (typically battery cells of the battery pack).

The compensation element 31 is advantageously thermally coupled to the NTC by means of the following appropriate technical measures:
- use of SMD components for the component 30 that is to be protected and the compensation element 31, which are arranged in close proximity in the layout and/or are thermally coupled by means of an appropriate copper distribution arrangement;
- use of components for the component 30 that is to be protected and the compensation element 31 having the lowest possible thermal capacitances;
- use of thermally conductive material (for example a heat-conducting paste) for the exchange of heat between the component 30 that is to be protected and the compensation element 31.

This thermal coupling achieves a situation in which a minimum electric current ("trip current"), which is required for the purposes of "switching" (that is to say to achieve intrinsic heating which drives the PTC into a relevant high-resistance range), flows through the compensation element 31 in the form of a PTC. The lower the resistance of the PTC, the higher this trip current will be. The thermal coupling with the NTC causes the PTC also to heat up, and thus increases its resistance, before the trip current has been achieved. This facilitates the selection of components in favor of low-resistance PTC components, which are conducive to the absence of any significant disturbance to temperature measurement.

The element 30 that is to be protected and the compensation element 31 with respect to their temperature coefficients of electrical resistance are advantageously matched to one another. The following is to be considered:
- the influence on the temperature measurement by the additional PTC component in the measuring path;
- safe "switching" of the PTC in the event of the fault requiring protection, that is to say intrinsic heating in response to a sufficient current flow;
- an equilibrium temperature in the event of the fault requiring protection that poses no risk to the system as a whole.

FIG. 7 shows a schematic illustration of a protective device 100 having contact elements and a series connection composed of the component 30 that is to be protected and the compensation element 31, the series connection being connected between a measuring contact 203 and a negative pole 202. A potential short-circuit path KP between the positive pole 201 and the measuring contact 203 is indicated.

Figure 8:
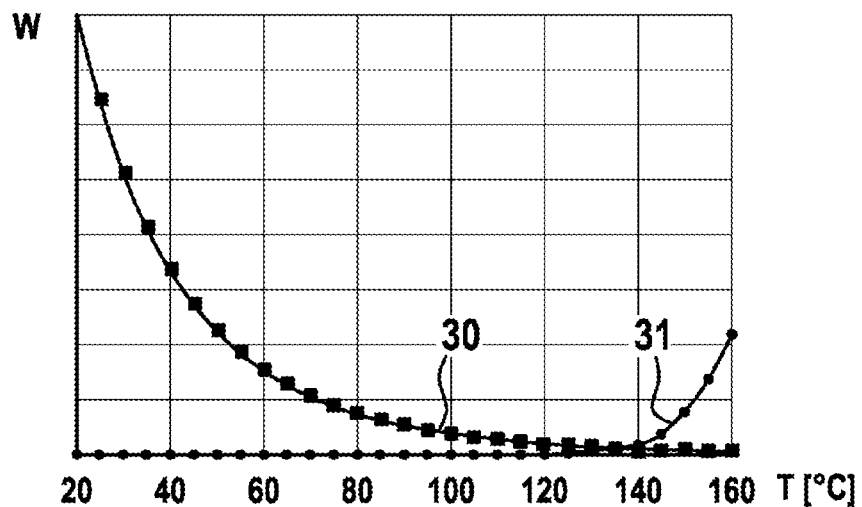

FIG. 8 shows an exemplary resistance characteristic, plotted against temperature, for NTC and PTC elements that are matched to one another in accordance with the disclosure. It can be seen that the electrical resistance W of the electronic component 30 decreases as the temperature rises and, at approximately 135° C., remains close to zero. It can also be seen that the electrical resistance W of the compensation element 31 is substantially low in comparison with the resistance of the electronic component 30 and increases as the temperature rises. The self-setting equilibrium temperature is dependent on the temperature at which the negative gradient of the resistance curve of the electronic component 30 corresponds in terms of magnitude to the positive gradient of the resistance curve of the compensation element 31, which, in the example illustrated, is also the case at approximately 135° C. At higher temperatures, this therefore signifies an increase in the total resistance and thus a reduction in the power loss.

The proposed protective device 100 can also advantageously comprise control electronics (not illustrated) for the evaluation of the temperature measurement.

An electrical energy store that is protected by means of the proposed protective device 100 can advantageously be designed as a rechargeable battery pack (for example a rechargeable battery pack for a hand-held power tool).

The compensation element 31 can in this case be connected directly or indirectly (for example via a switch) to a pole 202, 203 of the battery pack.

A heat transfer resistance between the electronic component 30 and the compensation element 31 is preferably configured so that tripping of the PTC is significantly promoted as a result.

Figure 9:
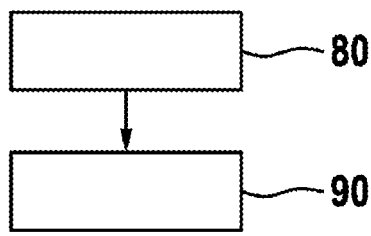
Figure 10:
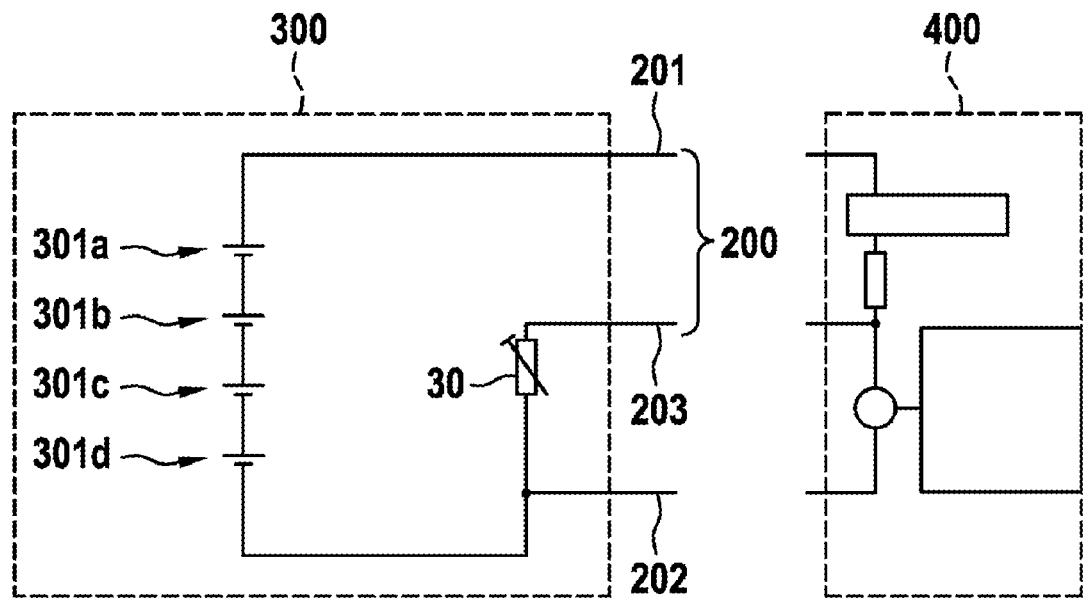
Figure 11:
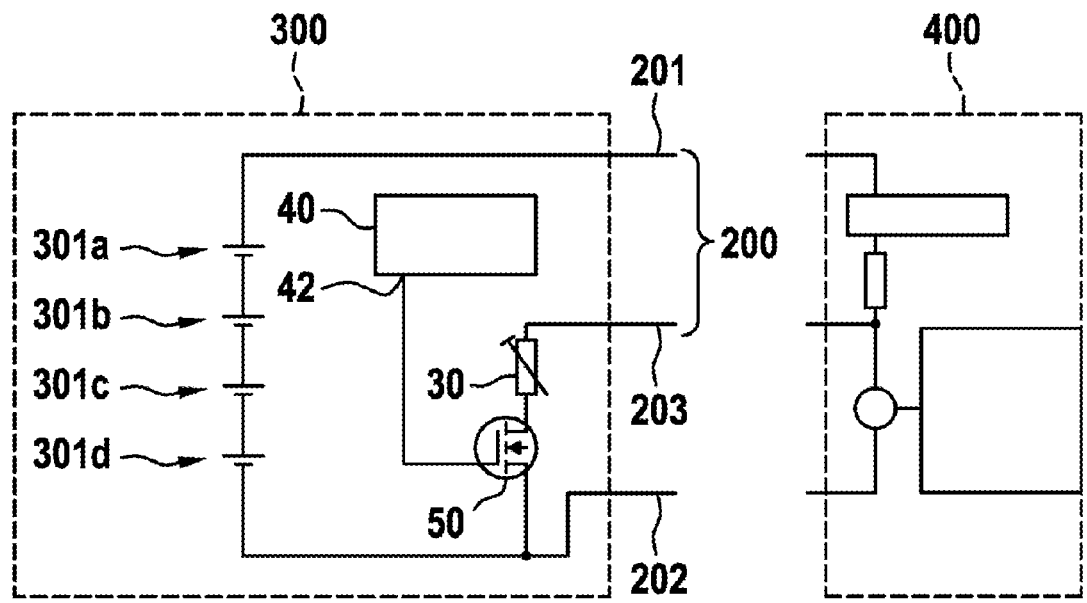
Figure 12:
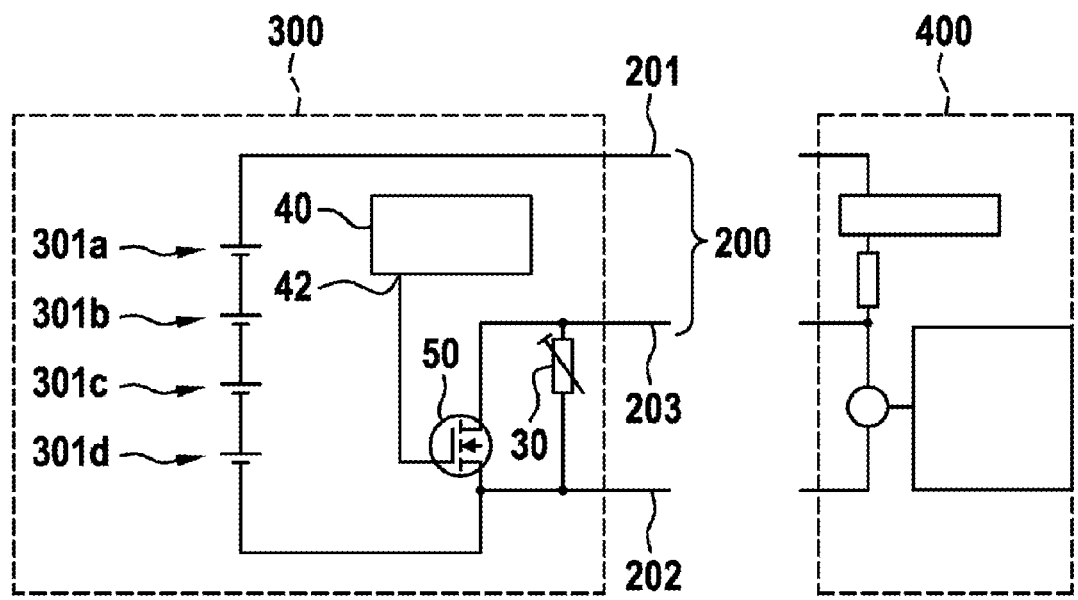

FIG. 9 shows a basic sequence diagram of a proposed method for producing a protective device for an electronic component 30 that is connected to an interface 200, wherein an electrical energy store is connected to the interface 200.

In a step 80, the component 30 is connected to a pole of the electrical energy store.

In a step 90, a compensation element 31 is connected in series between a pole 201, 202 of the electrical energy store and the electronic component 30 or between the electronic component 30 and a signal contact 203 of the interface 200, wherein the compensation element 31 assumes a positive temperature coefficient of electrical resistance, and wherein the component 30 and the compensation element 31 are thermally coupled to one another.

Figure 13:
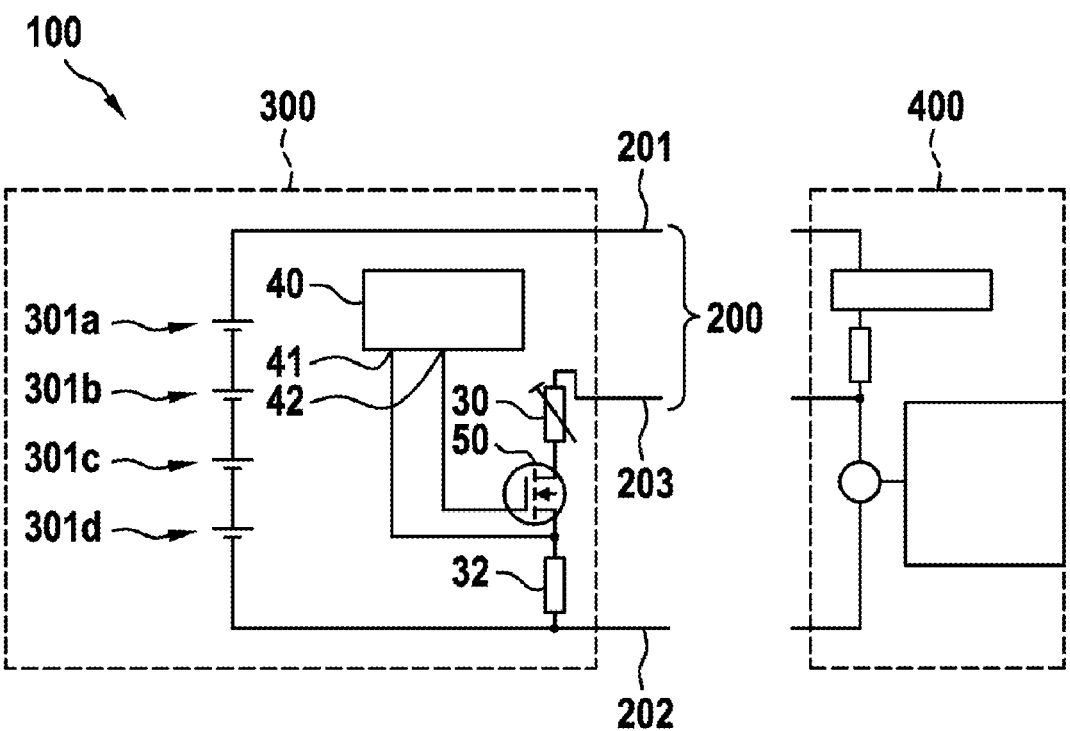

FIG. 13 shows another embodiment of a proposed protective device 100. The temperature of the cells 310a . . . 301n is detected by the device management device 400, which is arranged outside of the electrical energy store 300, using an electronic component 30, arranged in the electrical energy store 300, in the form of an NTC temperature sensor. However, as the management device 400 is used only to detect the electrical voltage at the interface 200 and is not essential to the disclosure, no further details thereof are addressed here. Alternatively, the electronic component 30 could also be designed as a coding resistor.

The electrical energy store 300 is also provided with a monitoring apparatus 40 having electronics (for example a microcontroller) to monitor individual cells 301a . . . 301d. In the event that a fault is detected by the monitoring apparatus 40, the latter isolates the electronic component from the interface 200 by means of an electronic switch 50, in the form of a transistor, which is connected in series with the electronic component 30.

Another resistor 32 ("measuring resistor") can be seen, which is connected in series with the electronic switch 50. The monitoring apparatus 40 is provided with an input 41 via which it can detect an electrical voltage at the measuring resistor 32. If, in the event of a fault, a high electric current flows through the series connection of the electronic component 30, the electronic switch 50 and the measuring resistor 32, this results in an electrical voltage drop at the measuring resistor 32 that is detected by the monitoring apparatus 40 at the input 41. In response, the monitoring apparatus 40 switches the electronic switch 50 to a blocking state, such that the above-mentioned electric current flow is interrupted.

The monitoring apparatus 40 can advantageously maintain this blocking state for a minimum time, for example longer than 1 s and, particularly advantageously, longer than 1 minute. In this way, it is advantageously possible to prevent the electronic switch 50 from being reclosed immediately since, in the event of the electric current being interrupted, the electrical voltage at the input 41 of the monitoring apparatus 40 is also close to zero and would thus be evaluated as uncritical.

A particular advantage of this proposed protective device 100 consists in that the measuring resistance 32 may be very low and thus only manipulates the actual temperature measurement by means of the electronic component 30 to a minimal extent. A resistance value of less than 1% of the minimum value of the electronic component 30 over the entire operating temperature range of the electrical energy store 300 is advantageous, with a resistance value of less than 0.3% of the minimum value of the electronic component 30 over the entire operating temperature range of the electrical energy store 300 being particularly advantageous. For example, the measuring resistor 32 can have a rating of 1 ohm, whereas the rating of a fuse for a low electric current of this type is typically 10 ohms. The monitoring apparatus 40 thus does not have to be capable of detecting the electric current through the electronic component 30 in normal operation but only in the event of an overcurrent fault.

As a result, this variant of the proposed protective device 100 can be realized in a particularly cost-effective and simple manner.

Integrated circuits having inputs that are provided for battery current measurement and which, in the event of an excessively high electric current, assume an alarm state are known. An integrated circuit of this type is also suitable for use in the arrangement according to FIG. 13, wherein a current input of the monitoring apparatus 40 is thus used as a measuring input. An excessively high electric current through the electronic component 30 is then interpreted by such a monitoring apparatus 40 as an excessively high battery current, which also results in the tripping of an alarm.

Figure 14:
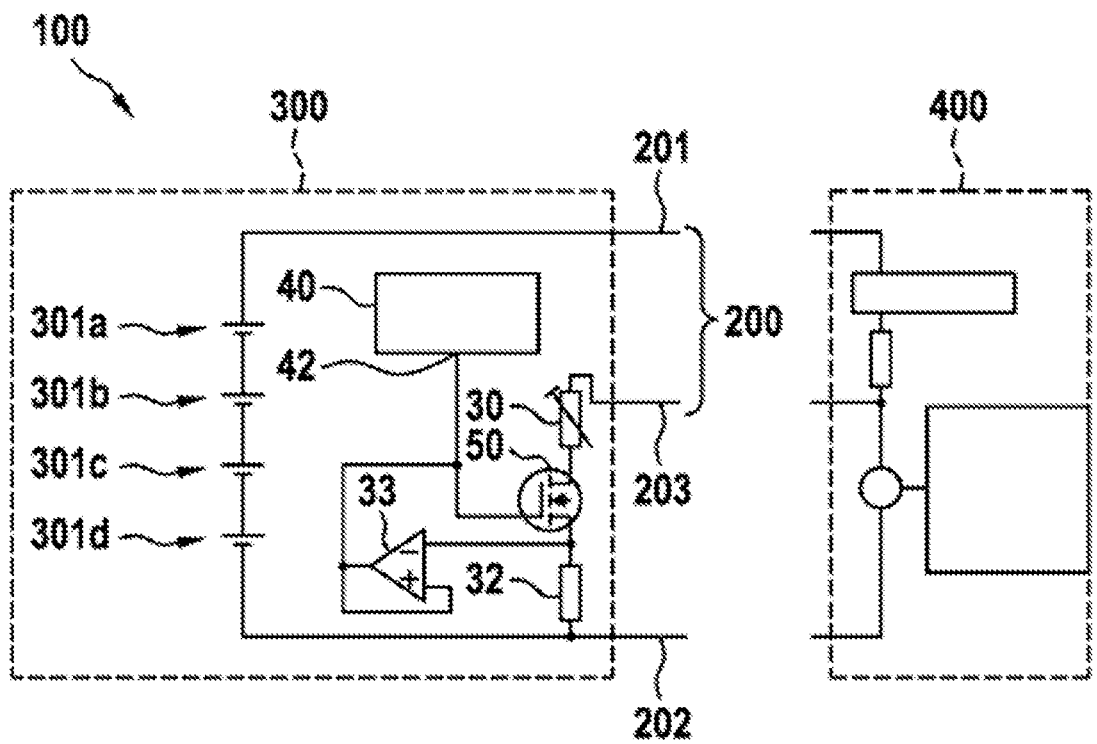

FIG. 14 shows a basic circuit diagram of another embodiment of a proposed protective device 100. It can be seen that, in this variant, an independent circuit based on a comparator circuit 33 (Schmitt trigger) can interrupt the electric current through the electronic component 30. The electrical voltage drop across the measuring resistor 32 triggers a change in the output level in the comparator circuit 33 to a value close to zero V. This switches the gate or base of the electronic switch 50 to "low", such that the electronic switch 50 is no longer conductive, independently of the output 42 (alarm output) of the monitoring apparatus 40.

The comparator circuit 33 is provided in this case with positive feedback, such that it maintains its state (that is to say output at zero V) even when the measuring signal is no longer applied to the input. This variant can be particularly appropriate if no further input is available at the monitoring apparatus 40 and/or the monitoring apparatus 40 does not assume a current monitoring function.

Figure 15:
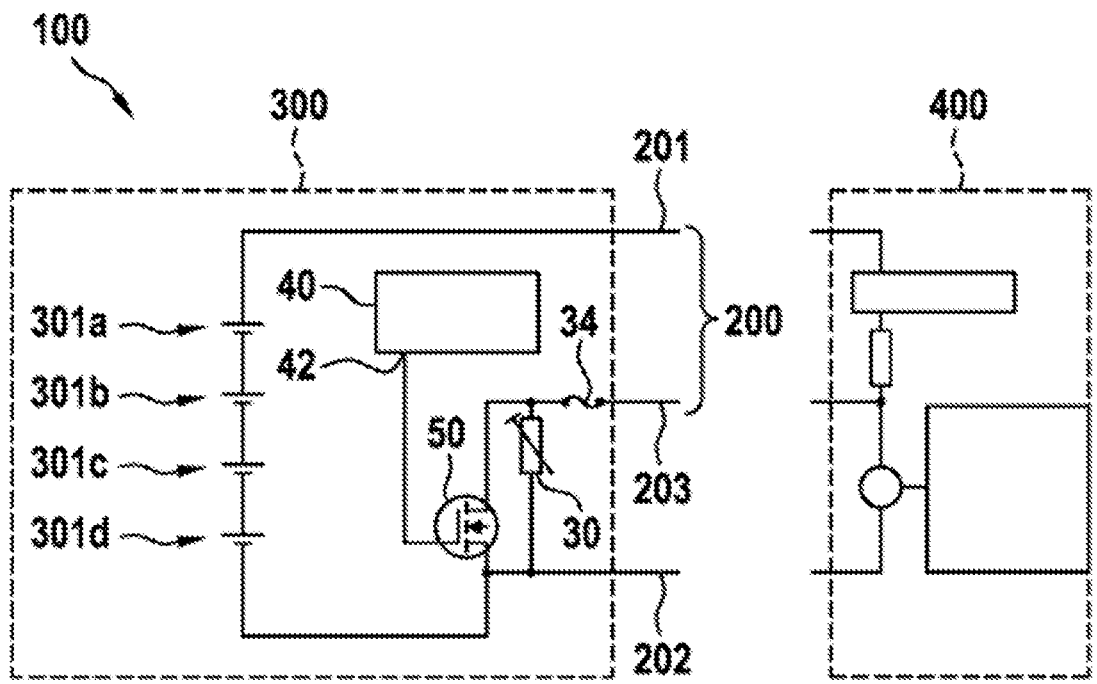

FIG. 15 shows a basic circuit diagram of another embodiment of a proposed protective device 100. This variant will be particularly preferred if the system is designed to bypass the electronic component 30 in the form of the NTC temperature sensor in the event of a fault. A safety element 34 (for example a fuse) can be seen, arranged in series with the electronic component 30, to which the electronic switch 50 is connected in parallel. A particular feature of this fuse consists in that it is not necessary for it to be rated for the electric current through the electronic component 30 in the event of a fault, but for a higher electric current. In normal operation, the safety element 34 is not tripped. This is therefore advantageous because the safety element 34 can then assume a low electrical resistance and only minimally manipulates the temperature measurement in normal operation.

Provision is made, in normal operation, for the monitoring apparatus 40 to close the electronic switch 50 in a cyclical or sporadic manner, for a specific and short time interval. This time interval is preferably selected to be sufficiently short that the connected management apparatus 400 (tool or charger) does not yet detect the latter as a fault. By way of example, this cycle time may be 50 ms.

In the event that a high electrical voltage is now applied to the input contact of the electronic component 30, the current-carrying capacity of which is not limited, the electronic switch 50 during this time enables the path for a high electric current, which is suitable for tripping or destroying the safety element 34.

By way of example, the safety element 34 can be designed as a trace fuse. According to IPC-2221, at a trace width of 0.1 mm, a temperature increase of 60° C. can be produced at 1.1 A.

In one alternative, the safety element 34 can also be designed as a fusible resistor.

Figure 16:
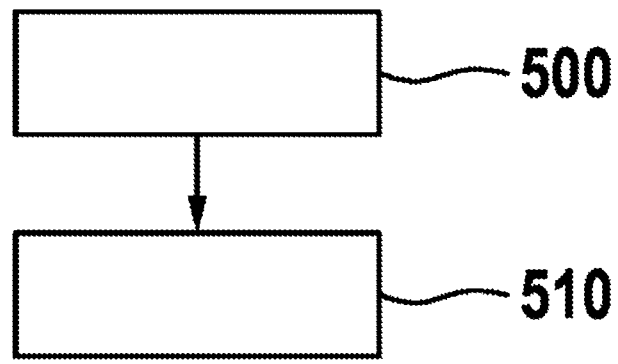

FIG. 16 shows a basic sequence of a method for operating a protective device 100 for an electronic component 30 that is connected to an interface 200.

In a step 500, an electrical voltage drop at a measuring resistor 32 connected in series with the electronic component 30 is detected.

In a step 510, the electronic component 30 is disconnected in the event of the electrical voltage drop overshooting a specified trip threshold.

The invention claimed is:

1. A protective device for an electronic component that is connected to an electrical interface, the protective device comprising:
   a detection apparatus configured to detect at least one of electrical voltage and electric current at the electronic component;
   a monitoring apparatus; and
   an electronic switch operably connected to the monitoring apparatus and connected in series with the electronic component, the electronic switch configured to (i) disconnect the electronic component from the electrical interface in response to an impermissibly high electrical voltage being applied to the electronic component, the impermissibly high electrical voltage being at least double a nominal voltage, and (ii) connect the electronic component to the electrical interface in response to the impermissibly high electrical voltage no longer being detected at the electronic component,
   wherein the detection apparatus is configured as a current detection apparatus that is interconnected in series with the electronic component and the electronic switch,
   wherein an electrical voltage drop is measured at the electronic component,
   wherein a discrete latch circuit is operably connected to the current detection apparatus, the discrete latch circuit is configured to evaluate the detected electrical voltage drop,
   wherein a state of the current detection apparatus is stored by the discrete latch circuit after the electronic component is disconnected, and
   wherein the stored state is (i) a connected state in which the electronic component is connected to the electrical interface, and (ii) a disconnected state in which the electronic component is disconnected from the electrical interface.

2. The protective device as claimed in claim 1, wherein a resistance value of the disconnection of the electronic component is at least approximately 1 kΩ to approximately 10 kΩ.

3. A protective device for an electronic component that is connected to an electrical interface, the protective device comprising:
   a detection apparatus configured to detect at least one of electrical voltage and electric current at the electronic component;
   a monitoring apparatus; and
   an electronic switch, connected in series wit hthe electronic component, configured to (i) disconnect the electronic component from the electrical interface in response to an impermissibly high electrical voltage being applied to the electronic component, the impermissibly high electrical voltage being at least double a nominal voltage, and (ii) connect the electronic component to the electrical interface in response to the impermissibly high electrical voltage no longer being detected at the electronic component,
   wherein the detection apparatus is configured as a voltage detection apparatus, and the voltage detection apparatus is connected in parallel with the electronic component and the switching apparatus.

4. The protective device as claimed in claim 1, wherein the monitoring apparatus is configured as a Schmitt trigger.

5. The protective device as claimed in claim 4, wherein an end stage for implementing electrical levels is provided at an output of the Schmitt trigger.

6. The protective device as claimed in claim 1, wherein the electronic component is one of a negative temperature coefficient (NTC) resistor and a coding resistor.

7. The protective device as claimed in claim 1, wherein (i) the monitoring apparatus is configured as a microcomputer, (ii) the detected electrical voltage is evaluated using an analog-to-digital converter, and (iii) the disconnection and the connection of the electronic component that is to be protected is implemented via software.

8. The protective device as claimed in claim 1, wherein the detected electrical voltage is evaluated using a small-signal MOSFET.

9. The protective device as claimed in claim 1, wherein the detected electrical voltage is fed to a comparator that uses a transistor to actuate a MOSFET that is to be switched.

10. The protective device as claimed in claim 1, wherein a current-limiting element is connected in series with the electronic component.

11. The protective device as claimed in claim 10, wherein the current-limiting element is at least one of a protective resistor, a conductor track, a current source, a fuse, and a resistor with a defined tripping behavior.

12. A method for operating a protective device for an electronic component that is connected to an electrical interface, the method comprising:
  detecting at least one of an electrical voltage and an electric current at the electronic component using a detection apparatus;
  disconnecting the electronic component from the electrical interface in response to an impermissibly high electrical voltage being applied to the electronic component using an electronic switch, the impermissibly high electrical voltage being at least double a nominal voltage;
  connecting the electronic component to the electrical interface in response to the impermissibly high electrical voltage no longer being detected at the electronic component using the electronic switch, wherein the detection apparatus is configured as a current detection apparatus that is interconnected in series with the electronic component and the electronic switch, wherein an electrical voltage drop is measured at the electronic component, and wherein a discrete latch circuit is provided to evaluate the detected electrical voltage drop; and
  storing a state of the current detection apparatus using the discrete latch circuit after the electronic component is disconnected,
  wherein the stored state is (i) a connected state in which the electronic component is connected to the electrical interface, and (ii) a disconnected state in which the electronic component is disconnected from the electrical interface.

13. The protective device as claimed in claim 2, wherein the resistance value is at least approximately 10 kΩ to approximately 500 kΩ.

14. The protective device as claimed in claim 13, wherein the resistance value is at least approximately 1 MΩ to approximately 10 MΩ.

* * * * *